(12) United States Patent
Kim et al.

(10) Patent No.: US 7,784,911 B2
(45) Date of Patent: Aug. 31, 2010

(54) APPARATUS AND METHOD FOR PRINTING BIOMOLECULAR DROPLET ON SUBSTRATE

(75) Inventors: Kui-hyun Kim, Yongin-si (KR);
Byung-chul Kim, Yongin-si (KR);
Kwang-ho Cheong, Yongin-si (KR);
Su-hyeon Kim, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 667 days.

(21) Appl. No.: 11/747,043

(22) Filed: May 10, 2007

(65) Prior Publication Data

US 2007/0263037 A1    Nov. 15, 2007

(30) Foreign Application Priority Data

May 12, 2006   (KR) .................. 10-2006-0042830

(51) Int. Cl.
*B41J 2/06* (2006.01)

(52) U.S. Cl. ........................................... 347/55; 347/54

(58) Field of Classification Search ............... 347/20, 347/44, 47, 51, 55, 54
See application file for complete search history.

(56) References Cited

U.S. PATENT DOCUMENTS

| | | | | |
|---|---|---|---|---|
| 2002/0003177 A1* | 1/2002 | O'Connor et al. | | 239/696 |
| 2003/0040129 A1 | 2/2003 | Shah | | |
| 2003/0150739 A1 | 8/2003 | Morozov et al. | | |

FOREIGN PATENT DOCUMENTS

| | | |
|---|---|---|
| EP | 1759759 | 3/2007 |
| KR | 1020050040162 | 5/2005 |
| KR | 100624467 | 9/2006 |
| KR | 100668343 | 1/2007 |
| WO | 0171311 | 9/2001 |

OTHER PUBLICATIONS

Z. Huneiti et al., Effects of Conducting liquid jet disintegration on specific charge of spray, 2001, Journal of Electrostatics, 51-52, pp. 558-564.*

"Macro-/Nanoporous Silicon as a Support for High-Performance Protein Microarrays"; Anton Ressine, et.al, Anal. Chem. 2003, 75, pp. 6968-6974 (Dec. 15, 2003).

(Continued)

*Primary Examiner*—Juanita D Stephens
(74) *Attorney, Agent, or Firm*—Cantor Colburn LLP

(57) ABSTRACT

An apparatus and method which print a biomolecular droplet onto a solid substrate using an electric charge concentration effect comprises: a needle shaped electric field forming electrode which is made of a conductive material, is disposed vertically, and comprises an accommodating area and a nozzle formed on a bottom end of the accommodating area; a solid substrate which is electrically grounded, is disposed below the electric field forming electrode, and comprises a moisture thin film and a target surface onto which the biomolecular droplet is discharged from the nozzle of the electric field forming electrode; and an open circuit type voltage applying unit which is electrically connected to the electric field forming electrode, applies a charge to the electric field forming electrode, and causes the biomolecular droplet to be ejected onto the target surface.

22 Claims, 14 Drawing Sheets

OTHER PUBLICATIONS

Jayasinghe et al.; "Electric field driven jetting: an emerging approach for processing living cells"; Biotechnology Journal, vol. 1, 2006, pp. 86-94.

Eagles et al.; "Electrohydrodynamic jetting of mouse neuronal cells"; Biochemical Journal, vol. 394, 2006, pp. 375-378.

Morozov et al.; "Electrospray Deposition as a Method for Mass Fabrication of Mono-and Multicomponent Microarrays of Biological and Biologically Active Substances"; Analytical Chemistry, vol. 71, No. 15, 1999, pp. 3110-3117.

Moerman et al.: "Miniaturized Electrospraying as a Technique for the Production of Microarrays of Reproducible Micrometer-Sized Protein Spots"; Analytical Chemistry, vol. 73, No. 10, 2001, pp. 2183-2189.

Yogi et al.; "On-Demand Droplet Spotter for Preparing Pico- to Femtoliter Droplets of Surfaces"; Analytical Chemistry, vol. 73, No. 8, 2001, pp. 1896-1902.

European Search Report for application No. 07107676.4-2104 dated Sep. 25, 2007.

Jayasinghe et al.; "Electrohydrodynamic Jet Processing: An Advanced Electric-Field Driven Jetting Phenomenon for Processing Living Cells"; Small, vol. 2, No. 2, 2006, pp. 216-219.

\* cited by examiner

BIOMOLECULAR DROPLET HAVING
A SIZE OF 50μm OR LESS

BIOMOLECULAR DROPLET HAVING
A SIZE OF 50μm OR LESS

APPARATUS AND METHOD FOR PRINTING BIOMOLECULAR DROPLET ON SUBSTRATE

This application claims priority to Korean Patent Application No. 10-2006-0042830, filed on May 12, 2006, and all the benefits accruing therefrom under 35 U.S.C. §119, the contents of which in its entirety are herein incorporated by reference.

BACKGROUND OF THE INVENTION

1. Field of the Invention

The present invention relates to an apparatus and method for printing biomolecular droplets on a substrate, and more particularly, to an apparatus and method which uses an electric charge concentration effect to stably and rapidly print biomolecular droplets which have a small volume and diameter on a desired position of a substrate, with narrow intervals between neighboring biomolecular droplets.

2. Description of the Related Art

As a result of the epoch-making development of the Human Genome Project, there is an increasing need for methods of rapidly providing a large amount of genetic information for the diagnosis, treatment and prevention of genetic disorders. Although the Sanger method of analyzing nucleotide sequences has been constantly developed through the development and automation of a polymerase chain reaction ("PCR") method, in which DNA is duplicated, the Sanger method is complex, time consuming, labor intensive, expensive and requires a substantial amount of expertise. Thus, a large number of genes cannot be analyzed using the Sanger method. As a result, new systems for analyzing nucleotide sequences are continuously being researched. In the last few years, there have been advances in many fields relating to the manufacture and application of biochips.

A biochip, that is, a biological microchip, includes a solid substrate which is made of, for example, silicon, surface-modified glass, polypropylene, or activated polyacrylamide and is combined with biomolecules, such as nucleic acids, proteins or cells, for example, but is not limited thereto. The biochip can be used to analyze gene developing patterns, genetic defects, protein distribution or various kinds of reaction patterns.

If a target material to be analyzed is applied to the biochip, the target material hybridizes with probes immobilized on the biochip. The hybridization is optically or radiochemically detected and analyzed to identify the target material. For example, if a fragment of target DNA to be analyzed is applied to a DNA chip (or DNA microarray) having probes, the target DNA complementarily hybridizes with the probes immobilized on the DNA chip. The hybridization is detected and analyzed using various detecting methods to identify the nucleotide sequence of the target DNA. This is known as sequencing by hybridization ("SBH").

An example of a printing apparatus for manufacturing a biochip or a DNA microarray is disclosed in Korean Patent Laid-Open Publication No. 2005-0040162. FIG. 1 is a schematic cross-sectional view of a printing apparatus 1 disclosed in the above reference for printing biomolecular droplets on a substrate using an electrohydrodynamic phenomenon. FIG. 2 is a schematic view illustrating an electric field generated when voltage is applied to the printing device 1 illustrated in FIG. 1. Referring to FIGS. 1 and 2, the printing device 1 includes: a first electric field forming electrode 4 which is needle-shaped, formed of a conductive material, is disposed vertically, and comprises an accommodating area 2 in which a biomolecular droplet, such as a nucleic acid (e.g., probe DNA, RNA, PNA and LNA), a protein (e.g., antigen and antibody), an oligopeptide, a eukaryotic cell (e.g., human cell, stem cell, animal cell and vegetable cell), a virus or bacteria is accommodated and a nozzle 3 formed on a bottom end of the accommodating area 2 through which the biomolecular droplet is discharged; a substrate 6 disposed below the first electric field forming electrode 4, and including a target surface 5 onto which a biomolecular droplet 10 discharged from the nozzle 3 of the first electric field forming electrode 4 is deposited; and a second electric field forming electrode 7 made of a conductive material, disposed below the first electric field forming electrode 4, and attached to the substrate 6. In addition, a voltage applying device 9 is connected to and applies a voltage to the first and second electric field forming electrodes 4 and 7 via an electrode lead wire 8.

In the printing device 1, when DC and AC voltages are simultaneously applied to the first and second electric field forming electrodes 4 and 7 by driving the voltage applying unit 9, an electric field is generated between the first and second electric field forming electrodes 4 and 7, as illustrated in FIG. 2. An electric force is created around the biomolecular droplet 10 due to interactions in the electric field generated as described above, the biomolecular droplet 10 having a free surface, and a dielectric constant gradient of the atmosphere. Accordingly, the biomolecular droplet 10 suspended from the nozzle 3 is ejected onto the target surface 5 of the substrate 6.

The printing device 1 can form the electric field between the first electric field forming electrode 4 and the substrate 6 when the substrate 6 is made of a conductive material or the second electric field forming electrode 7 made of a conductive material is attached to the substrate 6. Thus, the electrohydrodynamic effect can be generated to print the biomolecular droplet 10. Accordingly, the substrate 6 should be made of a conductive material or the surface of the substrate 6 should be conductive.

As illustrated in FIG. 2, the electric field may not be uniformly generated between the first electric field forming electrode 4 and the second electric field forming electrode 7. And therefore, the biomolecular droplet 10 may not be ejected onto a desired position of the target surface 5.

Also, when the distance between the first electric field forming electrode 4 and the second electric field forming electrode 7 is less than a predetermined distance, an electric discharge can be generated. Since the electric discharge may change the biochemical characteristics, size and volume of the biomolecular droplet 10, and the surface structure or characteristics of the substrate 6, the distance between the first electric field forming electrode 4 and the second electric field forming electrode 7 should be controlled to prevent the generation of the electric discharge. For example, when the substrate 6 is coated with polymethlymethacrylate ("PMMA") and the coating thickness is 5 μm, the distance between the first electric field forming electrode 4 and the second electric field forming electrode 7 is more than 750 μm to prevent the generation of the electric discharge. However, requiring a certain distance between the first electric field forming electrode 4 and the second electric field forming electrode 7 limits design of the device. In addition, if the distance between the first electric field forming electrode 4 and the second electric field forming electrode 7 is too great, it is difficult for the biomolecular droplet 10 to be ejected onto the desired position of the target surface 5.

FIG. 3 is a schematic cross-sectional view of another conventional printing apparatus for printing biomolecular droplets on a substrate using the electrohydrodynamic phenomenon. To eject the biomolecular droplet 10 (FIG. 2) onto the desired position of the target surface 5 (FIG. 1), a ring-shaped ground electrode is introduced as a second electrode to form an electric field only in a ring, as illustrated in FIG. 3 (Electric Field Driven Jetting: An Emerging Approach for Processing Living Cells, Biotechnol. J. 2006, 1, 86-94; Electric Field Driven Jetting: Electrohydrodynamic Jet Processing: An Advanced Electric-Field-Driven Jetting Phenomenon for Processing Living Cells Small. 2006, 2,No. 2, 216-219; Electrohydrodynamic Jetting of Mouse Neuronal Cells, Biochemical Journal, Jan. 4, 2006). Referring to the apparatus of FIG. 3, when biomolecular droplets are ejected out of an electrospray needle corresponding to a first electrode by an electric field formed in only the ring-shaped ground electrode, the biomolecular droplets are ejected only within the ring-shaped electrode and reach a substrate. However, although biomolecular droplets are ejected into only the ring-shaped electrode, in order to prevent electrical discharge the ring-shaped electrode must be separated from the electric spray needle, which prevents ejecting biomolecular droplets onto a desired position of the substrate.

FIG. 4 is a schematic cross-sectional view of a conventional printing apparatus for printing biomolecular droplets on a substrate using an electric charge concentration effect as disclosed in Korean Patent Laid-Open Publication No. 2005-0074496, which solves the problems associated with using the electrohydrodynamic phenomenon as described above. Referring to FIG. 4, in the printing apparatus 100a, when an open circuit type voltage applying unit 60a simultaneously applies a DC voltage and an AC voltage to an electric field forming electrode 20a after a biomolecular droplet is supplied to the apparatus 100a, positive charges migrate into the biomolecular droplet 10a (FIG. 5) suspended from a nozzle 23a and negative charges are induced on a substrate 30a which is electrically grounded. Thus, an electric field is formed between the positive charges and the negative charges as illustrated in FIG. 5. Accordingly, when positive charges migrate into the biomolecular droplet 10a, the negative charges are induced on a portion of the substrate 30a which is disposed opposite to the biomolecular droplet 10a, and a force is generated between the positive charges and the negative charges. In the prior art illustrated in FIGS. 4 and 5, the negative charges are induced below the biomolecular droplet 10a, so that the force is concentrated on the bottom of the biomolecular droplet 10a. The biomolecular droplet 10a suspended from the nozzle 23a is ejected onto a target surface 31a of the substrate 30a due to the force, as illustrated in the middle photo of FIG. 6 and in FIG. 7. Thus, the biomolecular droplet 10a is converted into an approximately hourglass-shaped biomolecular droplet 10a, and a neck (e.g., the thinner portion of an hourglass) is formed in the hourglass-shaped biomolecular droplet 10a. Accordingly, when the hourglass-shaped biomolecular droplet 10a suspended from the nozzle 23a is ejected onto the substrate 30a as illustrated in FIG. 7, the positive charges in the biomolecular droplet 10a are cancelled by the negative charges formed on the substrate 30a, resulting in a reduction in force. That is, the force which pulls the hourglass-shaped biomolecular droplet 10a suspended from the nozzle 23a downward is decreased. In addition, a surface tension A between the hourglass-shaped biomolecular droplet 10 and the substrate 30a, and a surface tension B between the hourglass-shaped biomolecular droplet 10a and the electric field forming electrode 20a act in opposite directions, as illustrated in FIG. 7. Thus, the biomolecular droplet 10a is separated at the neck-shaped portion of the hourglass-shaped biomolecular droplet 10a to become two separate biomolecular droplets. Accordingly, the biomolecular droplets are sequentially deposited on the substrate 30a as illustrated in the last photo of FIG. 6.

The substrate 30a of the apparatus 100a is grounded, thus eliminating or reducing any restriction to its material. In addition, negative charges can be induced on the substrate 30a by the positive charges which have migrated to the bottom portion of the biomolecular droplet 10a, enhancing the amount of positive charges (charge concentration) in the biomolecular droplet 10a in comparison to positive charges generated using the electrohydrodynamic phenomenon described in the prior art. Therefore, the biomolecular droplet 10a can be deposited on a desired position of the target surface 31a of the substrate 30a. In addition, a very high force acts so that the biomolecular droplet 10a can be printed with a smaller size and volume than those of the biomolecular droplet in the prior art. Furthermore, the substrate 30a is grounded, which prevents generation of the detrimental electric discharge associated with the electrohydrodynamic phenomenon as described above. As a result, the distance between the electric field forming electrode 20a and the substrate 30a can be freely adjusted. In summary, using the electric charge concentration effect allows the apparatus 100a to print biomolecular droplets with a small size and volume on a desired position of the substrate 30a.

However, a method of printing a biomolecular droplet with a small volume is required to manufacture a biochip having a high density using the electric charge concentration effect. In particular, the capability to print a biomolecular droplet having a volume as small as that of about 6 or less cells per biomolecular droplet is required in order to research interactions of some cells (e.g. stem cells). Furthermore, to conduct tissue engineering studies of cells (e.g. stem cells), the cells may need to be printed one by one with very small intervals between neighboring biomolecular droplets. In such studies, biomolecular droplet size is important, and the biomolecular droplet should be rapidly printed to assure that droplets have a homogenous volume.

Referring again to FIG. 4, the apparatus 100a, using the electric charge concentration effect instead of the conventional electrohydrodynamic method, is capable of printing a biomolecular droplet 10a which has a small size and volume at a desired position on the substrate 30a. However, it is still difficult to maintain a homogenous volume of the biomolecular droplet 10a and to control the position on which the biomolecular droplet 10a is deposited. There is also a limit to minimizing the small interval desired between biomolecular droplets according to the size of the biomolecular droplets using the methods described above. In addition, the biomolecular droplet 10a suspended from the nozzle 23a is unstable, which makes printing of the biomolecular droplet 10a time-consuming and slow.

BRIEF SUMMARY OF THE INVENTION

To overcome the problems described above, the present invention provides an apparatus and method with a modified substrate which rapidly and stably prints biomolecular droplets which have a small and homogenous volume and a narrow interval between neighboring droplets.

According to an exemplary embodiment of the present invention, an apparatus for printing a biomolecular droplet onto a substrate using an electric charge concentration effect comprises: an electric field forming electrode which is needle-shaped, is made of a conductive material, is disposed vertically, and comprises an accommodating area which accommodates the biomolecular droplet and a nozzle formed on a bottom end of the accommodating area through which the biomolecular droplet is discharged; a solid substrate which is disposed below the electric field forming electrode, includes a target surface onto which the biomolecular droplet discharged from the nozzle of the electric field forming electrode is deposited, is electrically grounded, and includes a moisture thin film thereon formed by dispersing water into solid components on a top surface of the substrate; and an open circuit type voltage applying unit which is electrically connected to the electric field forming electrode, applies a charge to the electric field forming electrode, and causes the biomolecular droplet to be ejected onto the target surface of the substrate due to a force generated by the charge in the electric field forming electrode and a charge induced on the substrate by the charge in the electric field forming electrode.

The solid substrate on which the moisture thin film is formed by dispersing water into solid components on a top surface of the substrate can be an agarose gel or a membrane filter soaked in water, but is not limited thereto.

An amount of agarose can be about 0.1 percent by weight to about 15 percent by weight of the agarose gel.

The membrane filter which can be used as the solid substrate is made of polycarbonate, nylon, cellulose acetate, polyester sulfone or Teflon® (polytetrafluoroethylene ("PTFE")).

The solid substrate can be a mesh having the same matter as that of the membrane filter and a size of about 40 μm to about 500 μm.

The biomolecular droplet can be selected from the group consisting of nucleic acids, proteins, oligopetides, saccharides, eukaryotic cells, stem cells, viruses and bacteria, but is not limited thereto.

When the apparatus for printing a biomolecular droplet is used, the biomolecular droplet can be printed to have a size of about 50 μm or less on the substrate.

In addition, the apparatus for printing a biomolecular droplet may further comprise a printer body which is disposed above the nozzle of the electric field forming electrode and supports the electric field forming electrode.

The electric field forming electrode and the open circuit type voltage applying unit are electrically connected to an electrode lead wire which is connected to a top end of the electric field forming electrode.

The open circuit type voltage applying unit simultaneously applies an AC voltage and a DC voltage to form an electric field below the biomolecular droplet suspended from the nozzle. The AC voltage may have a frequency in the range of about of 10 Hz to about 1,000 Hz. The DC voltage may be in the range of about 5 V to about 100,000 V and the AC voltage may be in the range of about 5 V to about 100,000 V. Alternatively, the DC voltage maybe in the range of about 500 V to about 10,000 V and the AC voltage may be in the range of about 500 V to about 10,000 V. In yet another exemplary embodiment, the DC voltage may have a voltage of about 2,000 V, and the AC voltage may have a voltage of about 500 V and a frequency of about 130 Hz.

The substrate may further comprise a planar part and a plurality of protrusions protruding upwards from the planar part, wherein each of the protrusions is a target surface of the substrate.

The substrate can be disposed substantially perpendicular to and below a longitudinal axis defining the electric field forming electrode.

The electric field forming electrode can be made of at least one material selected from the group consisting of a conductive metal, a conductive polymer and indium tin oxide ("ITO") glass. In addition, a portion of the nozzle of the electric field forming electrode can be hydrophobically treated.

A plurality of electric field forming electrodes can be arranged with a pitch, a plurality of target surfaces can be arranged on the substrate with the same pitch as the electric field forming electrodes, and each of the target surfaces can be disposed to correspond to one of the electric field forming electrodes.

According to another exemplary embodiment of the present invention, a method of printing a biomolecular droplet on a substrate using an electric charge concentration effect comprises: vertically disposing an electric field forming electrode which is needle-shaped, is made of a conductive material, and comprises an accommodating area in which the biomolecular droplet is accommodated and a nozzle formed at a bottom end of the accommodating area through which the biomolecular droplet is discharged; disposing a solid substrate below the electric field forming electrode, wherein the substrate is grounded and includes a target surface onto which the biomolecular droplet discharged from the nozzle of the electric field forming electrode is deposited, and includes a moisture thin film formed thereon by dispersing water into solid components on a top surface of the substrate; disposing an open circuit type voltage applying unit which is electrically connected to the electric field forming electrode; supplying a biomolecular droplet to the accommodating area of the electric field forming electrode; and separating the biomolecular droplet when the open circuit type voltage applying unit applies a voltage to the electric field forming electrode so that the biomolecular droplet is ejected onto the target surface of the substrate.

BRIEF DESCRIPTION OF THE DRAWINGS

The above and other aspects, features and advantages of the present invention will become more apparent by describing in further detail exemplary embodiments thereof with reference to the accompanying drawings, in which:

FIG. 1 is a schematic cross-sectional view of a conventional printing apparatus for printing biomolecular droplets on a substrate using an electrohydrodynamic phenomenon;

FIG. 2 is a schematic view of an electric field distribution formed when a voltage is applied to the printing apparatus of FIG. 1;

FIG. 3 is a schematic cross-sectional view of another conventional printing apparatus for printing biomolecular droplets on a substrate using the electrohydrodynamic phenomenon;

FIG. 4 is a schematic cross-sectional view of a conventional printing apparatus for printing biomolecular droplets on a substrate using an electric charge concentration effect;

FIG. 5 illustrates the distribution of positive charges in an electric field forming electrode and negative charges induced on the substrate by the positive charges in the electric field forming electrode, and a force applied to a biomolecular droplet suspended from a nozzle when a voltage is applied to the printing apparatus of FIG. 4;

FIG. 6 is a series of images illustrating a conventional process of printing biomolecular droplets using the printing apparatus of FIG. 4;

FIG. 7 is a schematic cross-sectional view illustrating surface tension affecting a biomolecular droplet having a neck defining an hourglass shape when the biomolecular droplet is ejected onto a substrate of the printing apparatus of FIG. 4;

FIG. 8 is a schematic cross-sectional view of an apparatus for printing a biomolecular droplet according to an exemplary embodiment of the present invention;

DETAILED DESCRIPTION OF THE INVENTION

Figure 1:
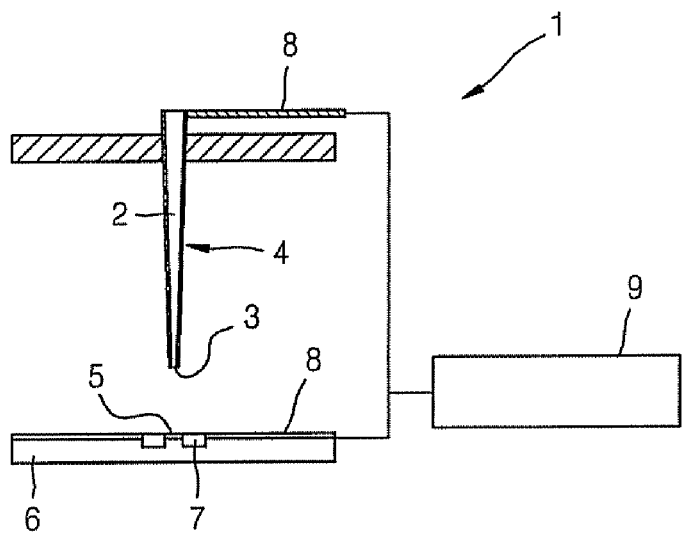
Figure 2:
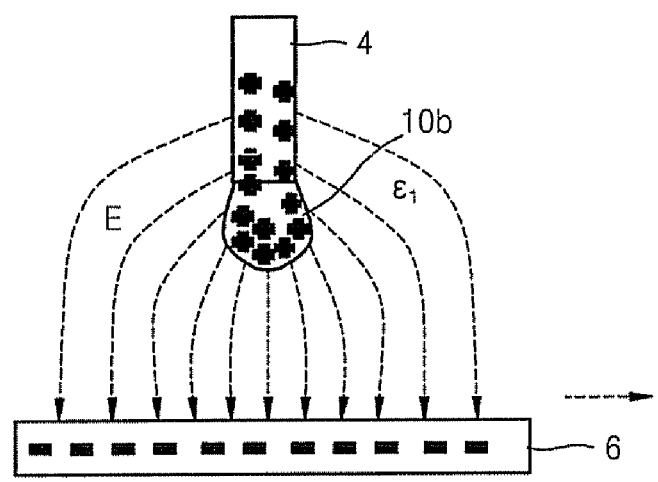
Figure 3:
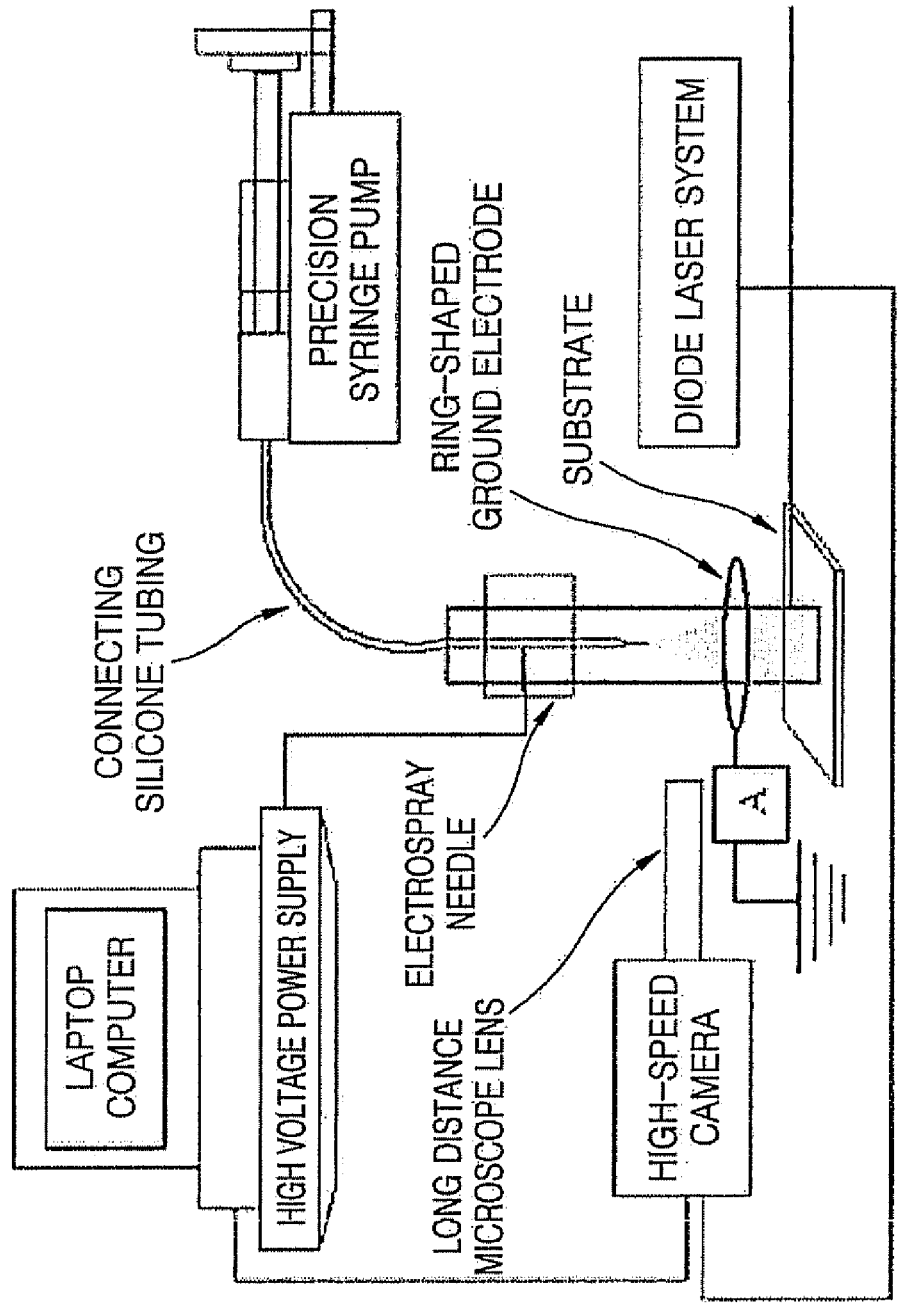

The invention now will be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the device in one of the figures were turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning which is consistent with their meaning in the context of the relevant art and the present disclosure, and will not be interpreted in an idealized or overly formal sense unless expressly so defined herein.

Exemplary embodiments of the present invention are described herein with reference to cross section illustrations which are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes which result, for example, from manufacturing. For example, a region illustrated or described as flat may, typically, have rough and/or nonlinear features. Moreover, sharp angles which are illustrated may be rounded. Thus, the regions illustrated in the figures are schematic in nature and their shapes are not intended to illustrate the precise shape of a region and are not intended to limit the scope of the present invention.

Hereinafter, an apparatus for printing a biomolecular droplet on a substrate according to one exemplary embodiment of the present invention will be described in further detail with reference to the accompanying drawings.

Figure 8:
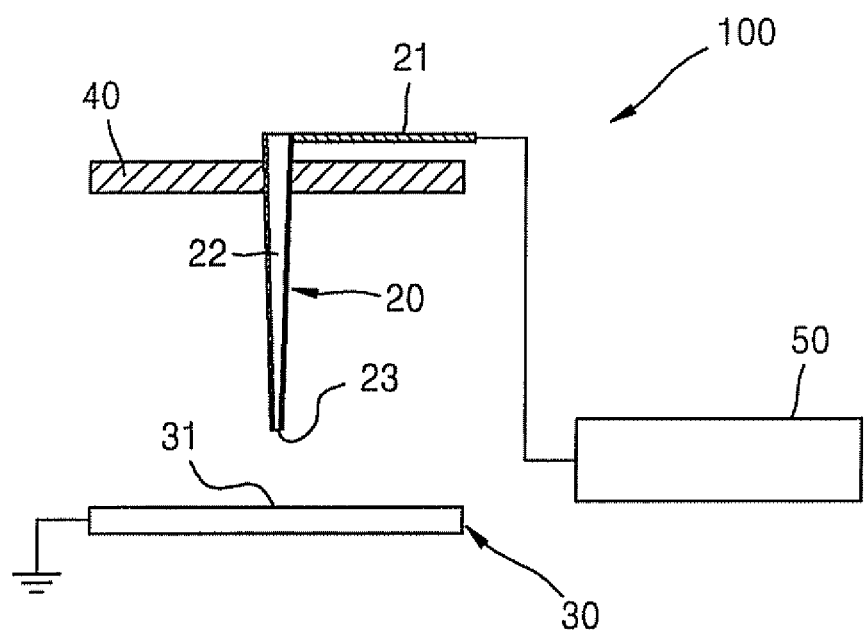
Figure 9:
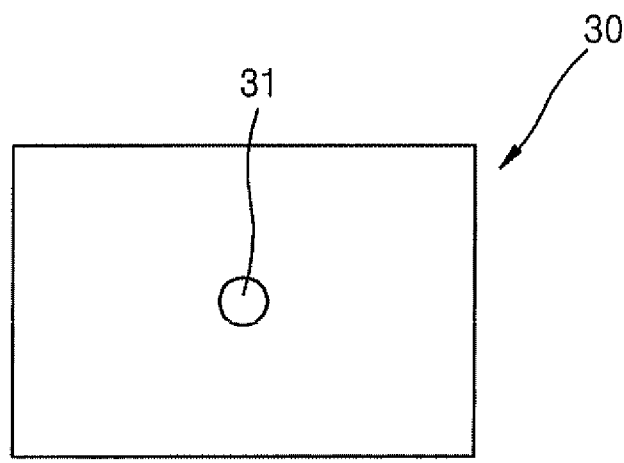
FIG. 9 is a plan view of the substrate of FIG. 8, according to an exemplary embodiment of the present invention.
Figure 10A:
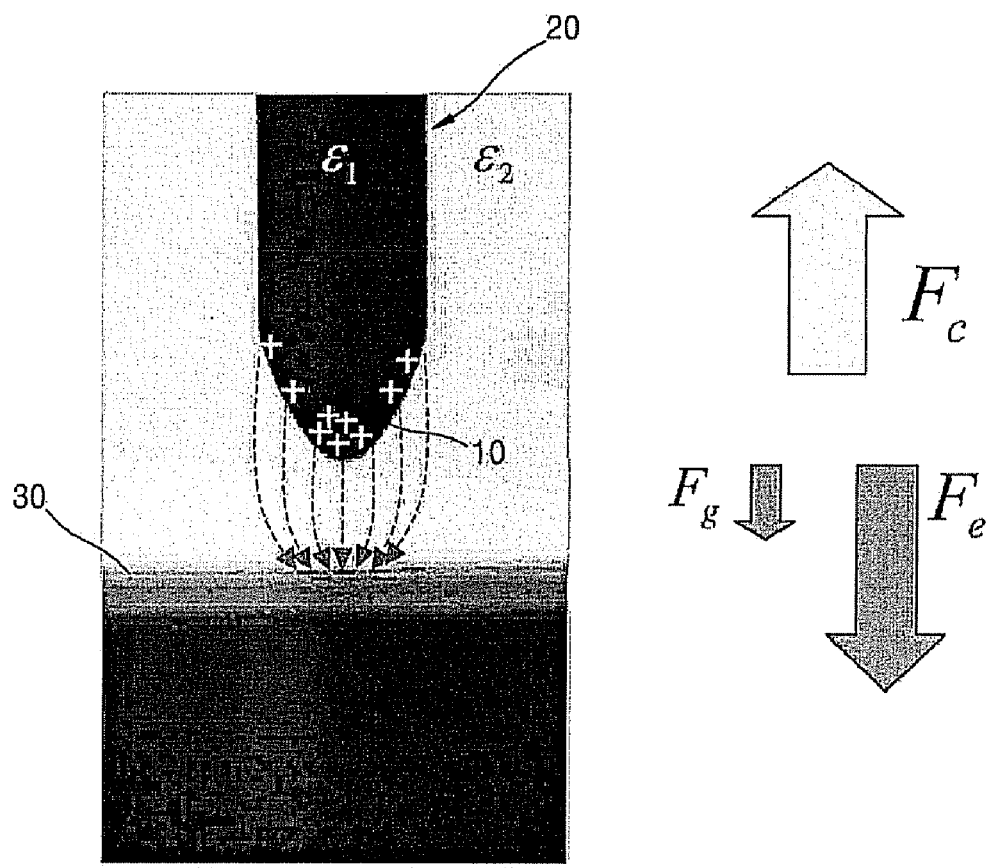
FIG. 10A illustrates the distribution of positive charges in an electric field forming electrode and negative charges induced on the substrate by the positive charges in the electric field forming electrode, and a force applied to a biomolecular droplet suspended from a nozzle when a voltage is applied to the printing device of FIG. 8 according to an exemplary embodiment of the present invention.
Figure 10B:
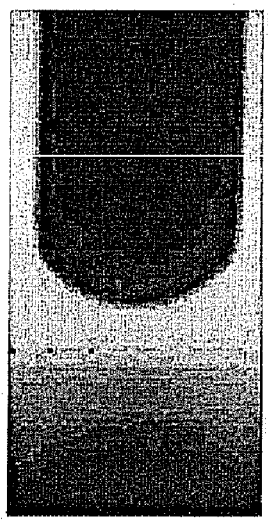
FIG. 10B is a microscopic image illustrating a stably printed biomolecular droplet according to an exemplary embodiment of the present invention.
Figure 11:
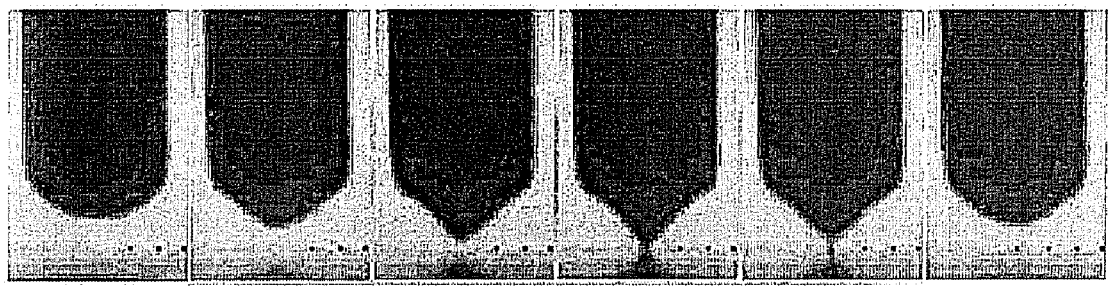
FIG. 11 is a series of microscopic images illustrating a process of printing a biomolecular droplet using an apparatus for printing a biomolecular droplet according to an exemplary embodiment of the present invention.
Figure 12:
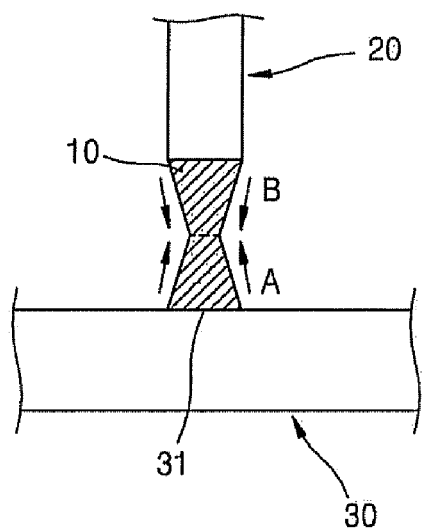
FIG. 12 is a schematic cross-sectional view of an apparatus for printing a biomolecular droplet according to an exemplary embodiment of the present invention illustrating surface tension affecting a biomolecular droplet having a neck defining an hourglass shape when the biomolecular droplet is ejected onto the substrate.
Figure 13A:
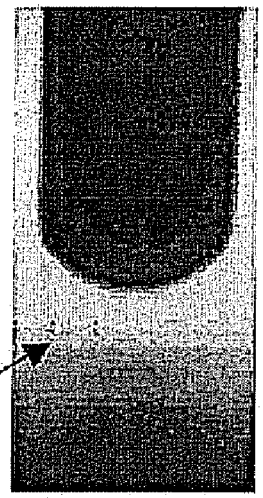
FIG. 13A is a microscopic image of a substrate and a nozzle of a printing apparatus which is printing a biomolecular droplet, wherein the substrate is formed of 2 percent by weight of agarose gel, according to an exemplary embodiment of the present invention.
Figure 13B:
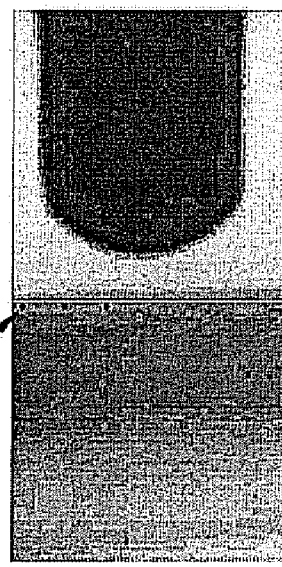
FIG. 13B is a microscopic image of a substrate and a nozzle of a printing apparatus which is printing a biomolecular droplet, wherein the substrate is formed of a polycarbonate membrane filter soaked in a medium according to an exemplary embodiment of the present invention.

FIG. 8 is a schematic cross-sectional view of an apparatus 100 for printing a biomolecular droplet according to an exemplary embodiment of the present invention, and FIG. 9 is a plane view of a substrate 30 shown in FIG. 8. FIG. 10A illustrates the distribution of positive charges in an electric field forming electrode 20 of the apparatus 100 and negative charges induced on the substrate 30 by the positive charges in the electric field forming electrode 20, and forces applied to a biomolecular droplet 10 suspended from a nozzle 23 (FIG. 8) when a voltage is applied to the apparatus 100 according to an exemplary embodiment of the present invention. FIG. 10B is a microscopic image showing that when the apparatus 100 illustrated in FIG. 8 is used, the biomolecular droplet 10 is stably printed on the substrate 30. FIG. 11 is a series of microscopic images illustrating a process of printing the biomolecular droplet 10 using the apparatus 100 of FIG. 8, according to an exemplary embodiment of the present invention. FIG. 12 illustrates a relationship between two types of surface tension which act on a neck of an hourglass-shaped biomolecular droplet 10 in a process, described later, of depositing the biomolecular droplet 10 on the substrate 30 using the apparatus 100 of FIG. 8.

Referring to FIGS. 8 through 12, the apparatus 100 which prints the biomolecular droplet 10 onto the substrate 30 using an electric charge concentration effect according to an exemplary embodiment of the present invention includes the electric field forming electrode 20, the substrate 30, a printer body 40 and an open circuit type voltage applying unit 50.

The electric field forming electrode 20 is made of at least one of a conductive metal such as gold, platinum or copper, for example, but is not limited thereto, a conductive polymer, ITO glass or carbon nanotubes. The electric field forming electrode 20 is formed in a longitudinal direction, thereby talking the shape of a needle and extending vertically. An electrode lead wire 21 connects to a top end of the electric field forming electrode 20. The electrode lead wire electrically connects the electric field forming electrode 20 to the open circuit type voltage applying -Lit 50.

The electric field forming electrode 20 includes an accommodating area 22 and the nozzle 23.

The biomolecular droplet 10 such as a nucleic acid (e.g., probe DNA, RNA, PNA and LNA), a protein (e.g., antigen and antibody), an oligopeptide, a eukaryotic cell (e.g., human cell, stem cell, animal cell and vegetable cell), a virus or bacteria is accommodated in the accommodating area 22.

The nozzle 23 is formed on the bottom end of the accommodating area 22, and is connected in fluid communication with the accommodating area 22. The inner diameter of the nozzle 23 is small enough to allow the surface tension of the biomolecular droplet 10 to suspend the biomolecular droplet 10 in the nozzle 23 unless a force is applied from outside. The biomolecular droplet 10 accommodated in the accommodating area 22 can be discharged from the accommodating area 22 via the nozzle 23 by an electric charge concentration effect, which will be described later. The area around the nozzle 23 is hydrophobically treated so that the contact angle between the biomolecular droplet 10 and the surface of the nozzle 23 is large enough to prevent the biomolecular droplet 10 from flowing outwards.

The substrate 30 can be a substrate for culturing cells or can be an element of a DNA microarray, for example, but is not limited thereto. The substrate 30 is a solid substrate on which a moisture thin film is formed on a top surface of the substrate by dispersing water into solid components on the top surface of the substrate. This provides benefits which flow from exemplary embodiments of the present invention, including allowing small volume homogenous biomolecular droplets to be stably and rapidly printed on the substrate 30 with narrow intervals therebetween. More specifically, the moisture thin film allows the negative charge induced by the positive charge formed in the biomolecular droplet 10 suspended from the nozzle 23 to be concentrated on a target surface 31 on the substrate 30 (FIGS. 8 and 9). As shown in FIG. 8, the target surface 31 is on a side of the substrate 30 which is closest to the nozzle 23 and is disposed below and perpendicular to the nozzle 23.

Figure 4:
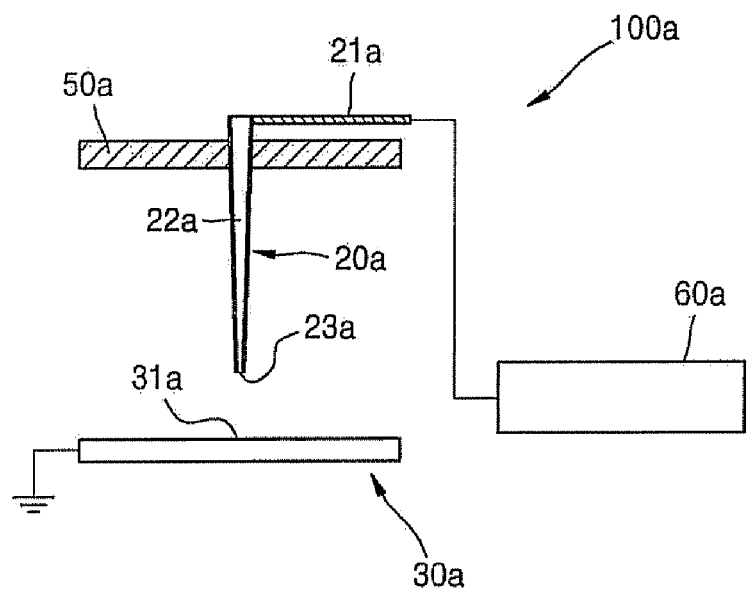
Figure 5:
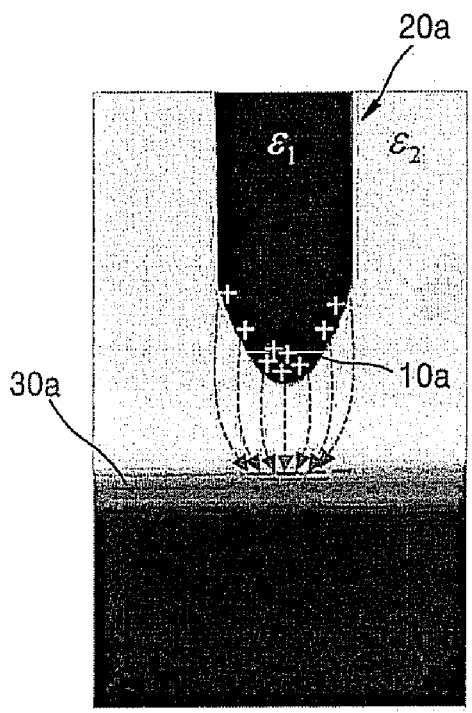

As described previously, in an apparatus for printing a biomolecular droplet disclosed in Korean Laid-Open Publication No. 2005-0074496 (as illustrated in FIG. 4), it is difficult to print homogenous biomolecular droplets which have diameters of about 50 μm or less with narrow intervals therebetween since a biomolecular droplet suspended from the nozzle 23a (FIG. 4) is unstable. It is also difficult to rapidly print homogenous, narrowly-spaced biomolecular droplets, since the biomolecular droplet suspended from the nozzle 23a trembles due to counter charges from impurities or closely-neighboring biomolecular droplets, for example, when a voltage is applied.

Therefore, according to an exemplary embodiment of the present invention, the moisture thin film provides an advantage of overcoming the problems discussed herein. The moisture thin film is formed on a top surface of the substrate 30. Therefore, the surface of the substrate 30 on which the moisture thin film is to be formed is made of a material in which water may be dispersed into solid components thereof, such as hydrogel, for example, but not limited thereto. That is, the substrate 30 used in an exemplary embodiment of the present invention is a solid substrate on which a moisture thin film is formed by dispersing water into solid components on a top surface of the substrate 30. Since the substrate 30 acts as both the surface on which the moisture thin film is formed as well as the solid substrate on which biomolecular drops are to be printed, the solid component of the substrate 30 is made of a biocompatible material, such as, but not limited to, an agarose gel or a membrane filter soaked in water. The amount of agarose is about 0.1 percent by weight to about 15 percent by weight of the agarose gel. When the amount of agarose is greater than about 15 percent by weight of the agarose gel, the amount of moisture becomes so small that the advantages of exemplary embodiments of the present invention are reduced or eliminated altogether. When the amount of agarose is less than about 0.1 percent by weight of the agarose gel, it becomes difficult to maintain a solid phase on the top surface of the substrate 30 and biomolecular droplets cannot be deposited on the substrate 30.

The membrane filter can be polycarbonate, nylon, celluloseacetate, polyester sulfone, or Teflon® polytetrafluoroethylene ("PTFE")). In addition, a mesh having a size of about 40 μm to about 500 μm and made of the same material as the membrane filter may be used. Water in which the membrane filter or mesh is soaked may be pure water and preferably a medium compatible with printed biomolecules.

Referring again to FIGS. 8, 9 and 10A, the substrate 30 is disposed below and substantially perpendicularly to a longitudinal axis defining the electric field forming electrode 20, and the target surface 31 is formed on the substrate 30. The biomolecular droplet 10 discharged via the nozzle 23 of the electric field forming electrode 20 is ejected onto the target surface 31. The substrate 30 is electrically grounded.

The printer body 40 is disposed above the nozzle 23 of the electric field forming electrode 20. The printer body 40 supports the electric field forming electrode 20 and is made of PMMA. The printer body 40 can be moved three-dimensionally along x-, y- and z-axes by a separate driving device (not shown). The electric field forming electrode 20 supported by the printer body 40 can be moved to be disposed above the target surface 31 and separated from the target surface 31 by a predetermined distance by the separate driving device (not shown).

The open circuit type voltage applying unit 50 is electrically connected to the electric field forming electrode 20. The open circuit type voltage applying unit 50 can simultaneously apply the DC and the AC voltages to the electric field forming electrode 20 via the electrode lead wire 21.

When the AC and DC voltages are applied to the field forming electrode 20, positive charges migrate into the biomolecular droplet 10 suspended from the nozzle 23. The positive charges in the field forming electrode 20 induce negative charges on the substrate 30. Accordingly, an electric field is formed between the positive and negative charges, as illustrated in FIG. 10A. The biomolecular droplet 10 is ejected onto the target surface 31 of the substrate 30 due to the force generated between the positive charges migrated in the electric field forming electrode 20 and negative charges induced on the substrate 30 by the positive charges in the electric field forming electrode. At this time, in a conventional solid substrate as described in reference to the prior art, an undesirable phenomenon occurs in which the biomolecular droplet 10 suspended from the nozzle 23 trembles due to counter charges from solid or liquid impurities or adjacent biomolecular droplets. However, in an exemplary embodiment of the present invention discussed herein, using a substrate which has a moisture thin film thereon ensures that a counter charge is concentrated only on a target surface of the substrate and that undesired counter charges are homogenously dispersed.

Figure 6:
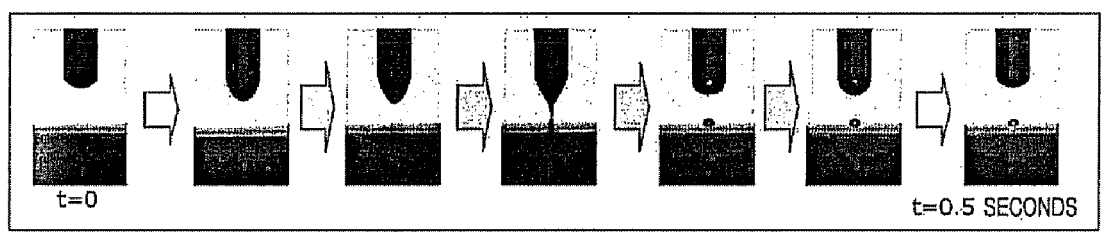
Figure 7:
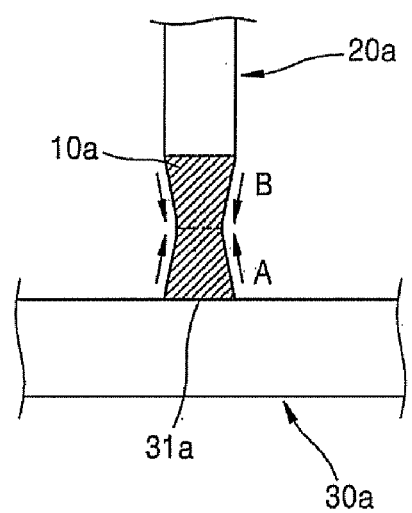
Figure 14A:
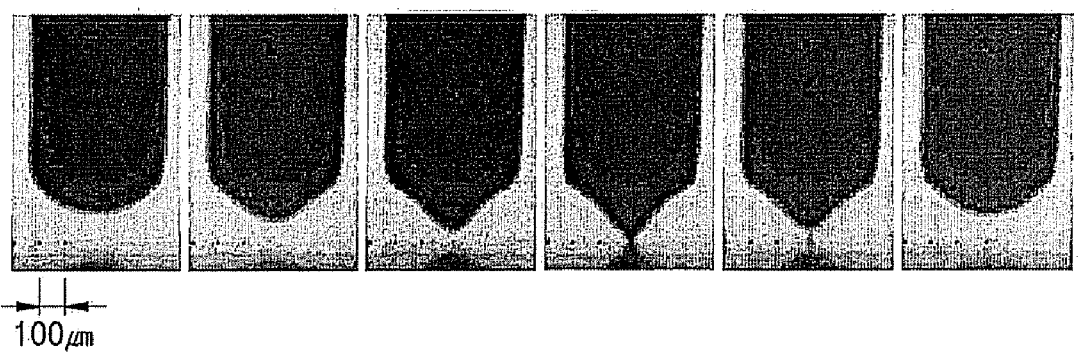
FIG. 14A is a series of microscopic images illustrating a printing of one biomolecular droplet in a process of printing biomolecular droplets 48 times in a row at intervals of 100 μm on a substrate formed of 2 percent by weight of agarose gel according to an exemplary embodiment of the present invention.

FIG. 10A illustrates the relationship between forces existing in the biomolecular droplet 10 suspended from the nozzle 23 of the electric field forming electrode 20. Referring to FIG. 10A, when a voltage is applied to the electric field forming electrode 20, forces act on the biomolecular droplet 10 suspended from the nozzle 23. The forces are gravity ($F_g$), surface tension ($F_c$) and a Coulomb force ($F_e$) between the positive charges in the biomolecular droplet 10 and the induced negative charges on the substrate 30. The gravity ($F_g$), the surface tension ($F_c$) and the Coulomb force ($F_e$) act as illustrated in FIG. 10A. Immediately before the biomolecular droplet 10 is ejected, the gravity, surface tension and the Coulomb force between the charges are in equilibrium according to equation 1.

$$(F_g)+(F_e)=(F_c) \tag{1}$$

where $F_g=\rho g \Delta V^{drop}$ ($\rho$ is the density of the biomolecular droplet 10, g is acceleration of gravity and $\Delta V^{drop}$ is the volume of the biomolecular droplet 10 suspended from the nozzle 23), $F_c=2\pi R\gamma$ (R is the radius of the nozzle 23 and $\gamma$ is a surface tension of the biomolecular droplet 10 per unit length), and $F_e=\rho_f E - E^2 \nabla \in/2$ ($\rho_f$ is the free charge of the biomolecular droplet 10, E is the magnitude of the electric field and $\in$ is the dielectric constant). The Coulomb force ($F_e$) is the sum of an electrophoretic force ($\rho_f E$) and a dielectrophoretic force ($-E^2 \nabla \in/2$).

In equation 1,gravity ($F_g$) is proportional to the volume of the biomolecular droplet 10 suspended from the nozzle 23, but the volume of the biomolecular droplet is sufficiently small to ignore gravity in equation 1.

Thus, when the Coulomb force ($F_e$) becomes greater than the surface tension ($F_c$) of the biomolecular droplet 10 suspended from the nozzle 23, the equilibrium of the forces is not maintained and the biomolecular droplet 10 is ejected onto the target surface 31 of the substrate 30. In addition, the charges concentrated in the lower portion of the biomolecular droplet 10 suspended from the nozzle 23 induce counter-charges on a portion of the substrate 30 which is directly below the biomolecular droplet 10. Therefore, the Coulomb force ($F_e$) is generated between the charges in the biomolecular droplet 10 and the counter-charges in the substrate 30. Thus, the biomolecular droplet is ejected onto the surface of the substrate 30 due to the force generated by the electric charge concentration effect.

An undesired counter charge which can be induced on an area besides the target surface 31 of the substrate 30 perpendicularly disposed below the nozzle 23 by an electric charge concentration effect can be homogenously dispersed according to an exemplary embodiment of the present invention by using a solid substrate which includes a moisture thin film formed thereon. When the solid substrate including a moisture thin film formed thereon is used, it prevents a counter charge from being concentrated on an area other than the target surface 31 as described above. This is because mobility of charges in a liquid is greater than mobility of charges in a solid. In the solid substrate including a moisture thin film formed thereon, although a counter charge is temporarily induced on an area other than the target surface 31 the counter charge induced on the area other than the target surface 31 is rapidly and homogenously dispersed by the moisture thin film. Therefore, undesired counter charges are reduced or eliminated and the target surface 31 is the only area in which a counter charge is induced by the electric charge concentration effect, providing an advantage of stabilizing the biomolecular droplet 10 suspended from the nozzle 23. As a result, the biomolecular droplet 10 can be rapidly printed with a small and homogenous volume and a narrow interval between neighboring biomolecular droplets. Exemplary embodiments of the present invention provide another advantage, in that rapid printing of the biomolecular facilitates a phenomenon which decreases the downward gravity force which tends to forces the biomolecular droplet 10 accommodated in the accommodating area 22 toward the nozzle 23 of the accommodating area 22. As a result, a larger number of biomolecules can exist in the biomolecular droplet 10 compared to when a conventional solid substrate is used without a moisture thin film.

In exemplary embodiment, the AC and DC voltages are simultaneously applied to the electric field forming electrode 20 by the open circuit type voltage applying unit 50. The DC voltage is in a range of about 5 V to about 100,000 V and the AC voltage is in a range of about 5 V to about 100,000 V and has a frequency of about 10 Hz to about 1,000 Hz. In another exemplary embodiment, the DC voltage is in a range of about 500 V to about 10,000 V and the AC voltage is in a range of about 500 V to about 10,000 V and has a frequency of about 10 Hz to about 1,000 Hz. In another exemplary embodiment, the DC voltage is about 2,000 V, and the AC voltage is about 500 V and has a frequency of about 130 Hz. When the DC voltage and the AC voltage are not within these ranges, the biomolecular droplet 10 is not efficiently ejected onto the substrate 30.

Hereinafter, a method of printing the biomolecular droplet 10 onto the substrate 30 using the electric charge concentration effect with the apparatus 100 according to an exemplary embodiment of the invention will be described in further detail with reference to the accompanying drawings.

First, the driving device (not shown) moves the printer body 40 (FIG. 8) which supports the electric field forming electrode 20 above the target surface 31 on the substrate 30. The biomolecular droplet 10 comprising biomolecules such as a nucleic acid (e.g., probe DNA, RNA, PNA and LNA), a protein (e.g., antigen and antibody), an oligopeptide, a eukaryotic cell (e.g., human cell, stem cell, animal cell and vegetable cell), a virus or bacteria is supplied to the accommodating area 22 of the electric field forming electrode 20. The inner diameter of the nozzle 23 formed on the bottom of the electric field forming electrode 20 is small enough that the biomolecular droplet 10 is suspended from the nozzle 23 due to surface tension against gravity unless an outside force is applied.

After the biomolecular droplet 10 is supplied to the accommodating area 22 as described above, the open circuit type voltage applying unit 50 simultaneously applies the DC voltage (in a range of about 5 V to about 100,000 V) and the AC voltage (in a range of about 5 V to about 100,000 V with a frequency of about 10 Hz to about 1,000 Hz) to the electric field forming electrode 20. As a result, positive charges migrate into the biomolecular droplet 10 suspended from the nozzle 23, and negative charges are induced on the substrate 30, which is grounded. Accordingly, an electric field is generated between the positive charges and the negative charges, as illustrated in FIG. 10A, and a force is generated between the positive charges and the negative charges. Since the negative charges are induced below the biomolecular droplet 10, (e.g., on the target surface 31), the force is concentrated on a bottom portion of the biomolecular droplet 10. This causes the biomolecular droplet suspended from the nozzle 23 to flow down toward the substrate 30 by the force generated by the electric charge concentration, as shown in the fourth photo from the left in FIG. 11. Referring to FIG. 12, the biomolecular droplet 10 is thereby converted to an approximately hourglass shape, and a neck shape (e.g. the thinner portion of an hourglass) is formed in the biomolecular droplet 10. Accordingly, the positive charge in the biomolecular droplet 10 combines with the negative charge of the substrate and is thereby reduced, resulting in a reduction in a force. That is, the force which pulls the biomolecular droplet 10 suspended from the nozzle 23 down toward the substrate 30 is decreased. In addition, a surface tension A between the neck-shaped portion of the biomolecular droplet 10 and the substrate 30, and a surface tension B between the neck-shaped portion of the biomolecular droplet 10 and the electric field forming electrode 20 act in opposite directions as illustrated in FIG. 12. Therefore, as the positive charge is reduced, the force is decreased while at about the same time the surface tensions A and B act in opposite directions such that the biomolecular droplet 10 is separated at the neck-shaped portion and becomes two separate biomolecular droplets. Accordingly, the two biomolecular droplets are sequentially ejected and deposited on the substrate 30 as illustrated in the last photo of FIG. 11.

Hereinafter, experiments performed to confirm the advantages flowing from exemplary embodiments of the present invention over the prior art will be described with reference to the accompanying drawings.

In Experiment 1,an agarose gel containing 98 percent by weight of water and 2 percent by weight of agarose was used as a substrate. The agarose gel was prepared by mixing agarose (Sigma) and water in the above ratio, heating, dissolving and then hardening to a plate shape having a thickness of 0.5 cm at room temperature. In Experiment 2,a polycarbonate membrane filter (GE osmonics) soaked in a medium which was the same medium which comprised a biomolecular droplet accommodated in the accommodating area 22 was used as a substrate. In a control group, a cover glass was used as a substrate.

In an apparatus for printing a biomolecular droplet on a substrate according to FIG. 8 as described above, an electric field forming electrode having a diameter of 0.46 mm was prepared, and a distance between the substrate and the electric field forming electrode was 250 μm. A biomolecular droplet accommodated in the accommodating area was prepared by adding A549 (KOREAN CELL LINE BANK, KCLB10185) cells having a concentration of 10×106 cells/mL into RPMI media, 10% fetal bovine serum ("FBS") and 1XAntibiotics. An AC voltage of 3 kV at a frequency of 4 kHz were applied to the electric field forming electrode and 48 biomolecular droplets were deposited on the substrate at intervals of 100 μm by setting the size of the biomolecular droplets suspended from the nozzle to a predetermined level.

FIG. 13A is a microscopic image of a nozzle and the substrate formed of 2 percent by weight agarose gel according to Experiment 1.

FIG. 13B is a microscopic image of a nozzle and the substrate of the printing apparatus according to Example 2. FIGS. 13A and 13B confirm that biomolecular droplets with a size of 50 μm or less were stably printed with predetermined intervals (100 μm) on the 2 percent by weight agarose gel substrate as well as the polycarbonate membrane substrate, respectively. In addition, the microscopic images in FIG. 14A illustrate the process of printing biomolecular droplets using the apparatus for printing biomolecular droplets using 2 percent by weight agarose gel as the substrate according to Experiment 1. Referring to FIG. 14A, it can be seen that biomolecular droplets were printed at predetermined intervals of 100 μm as described above and the biomolecular droplets suspended from the nozzle were stably printed on the substrate. In addition, it was confirmed that the biomolecular droplets in FIG. 14A were printed on the substrate such that the biomolecular droplets suspended from the nozzle in FIG. 14A contacted the substrate with a narrower cross-section than in the case of FIG. 6, which illustrates a process of printing biomolecular droplets using the apparatus for printing a biomolecular droplet disclosed in prior art according to Korean Laid-Open Publication No. 2005-0074496.

Figure 14B:
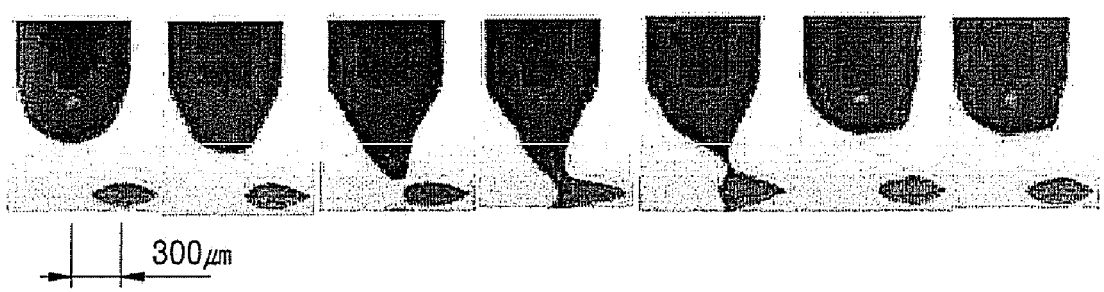
FIG. 14B is a series of microscopic images illustrating a printing of one biomolecular droplet in a process of printing biomolecular droplets at intervals of 300 μm on a cover glass substrate according to an exemplary embodiment of the present invention.

On the other hand, in the case of the control group using the cover glass as the substrate, biomolecular droplets were not discretely printed at intervals of 100 μm, and only when the intervals between biomolecular droplets were increased to at least 200 μm were biomolecular droplets not mixed with neighboring biomolecular droplets already printed. Furthermore, the interval required between biomolecular droplets in order to stably print the biomolecular droplets without mixing between biomolecular droplets to be printed was 300 μm. FIG. 14B illustrates the control group, in which microscopic images show a process of printing one biomolecular droplet when biomolecular droplets were printed at intervals of 300 μm. Referring to FIG. 14B, the biomolecular droplets were printed at intervals of 300 μm and the biomolecular droplets suspended from the nozzle were not separated from adjacent biomolecular droplets and trembled towards the adjacent biomolecular droplets. As a result, the two biomolecular droplets were not discretely printed.

Figure 15A:
FIG. 15A is a microscopic image of biomolecular droplets printed at intervals of 100 μm on a substrate formed of 2 percent by weight of agarose gel according to an exemplary embodiment of the present invention.
Figure 15B:
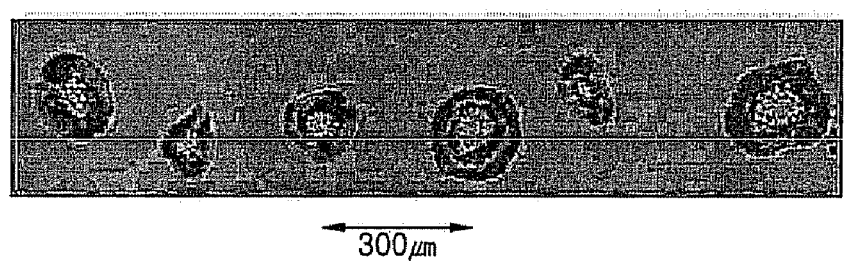
FIG. 15B is a microscopic image of biomolecular droplets printed on a cover glass substrate at intervals of 300 μm according to an exemplary embodiment of the present invention.

Further comparing Experiment 1 (using 2 percent by weight of an agarose gel) and the control group (using cover glass), the condition of the printed biomolecular droplets was observed. FIG. 15A is a microscopic image of biomolecular droplets printed on the substrate in Experiment 1, and FIG. 15B is a microscopic image of the control group. Referring to FIG. 15A, the biomolecular droplets were printed at intervals of 100 μm and the size of the biomolecular droplets was relatively uniform. However, referring to FIG. 15B, although the biomolecular droplets were printed at an interval of 300 μm, the distance between printed biomolecular droplets had a significant variation, and the size of the biomolecular droplets was not uniform and had a significant variation.

Figure 16:
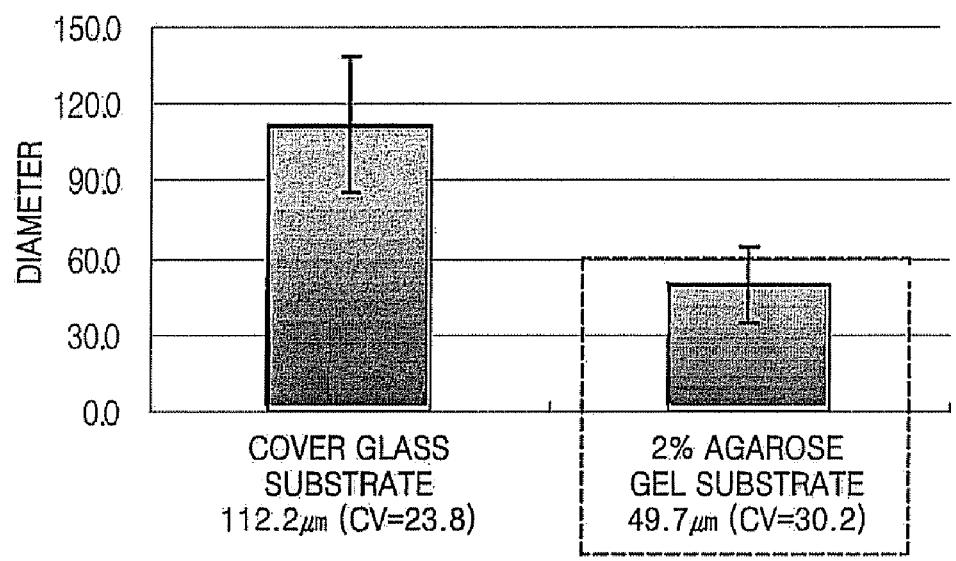
FIG. 16 is a graph of average droplet diameters and coefficients of variation over 48 trials, obtained by measuring diameters of each biomolecular droplet printed on substrates formed of 2 percent by weight of agarose gel and cover glass according to exemplary embodiments of the present invention.

To confirm that the volume of the printed biomolecular droplets was lower in Experiment 1 compared to that in the control group, the diameter of the printed biomolecular droplets was measured for both cases, and averages and coefficients of variation ("CV") were calculated. The results are illustrated in FIG. 16. As shown in FIG. 16, when the 2 percent by weight agarose substrate was used, the average diameter of the printed biomolecular droplets was 49.7 μm with a CV of 30.2, and when the cover glass substrate was used, the average diameter of the printed biomolecular droplets was 112.2 μm with a CV of 23.8. Accordingly, it was confirmed that the average diameter of the biomolecular droplets according to an exemplary embodiment of the present invention was decreased by 62.5 μm compared to the control group. The CV was higher when the 2 percent by weight agarose substrate was used compared to when the cover glass substrate was used, but this increase in CV is not significant in comparison to the large reduction in a diameter of the biomolecular droplets in Experiment 1 as compared to the control group.

In Experiment 1, it was confirmed that when the biomolecular droplets were printed to have a diameter of 50 μm, a 100 μm interval between biomolecular droplets could be maintained. To confirm whether an interval between biomolecular droplets can be maintained at 100 μm regardless of the size of previously-printed biomolecular droplets, Experiment 3 was performed.

Figure 17:
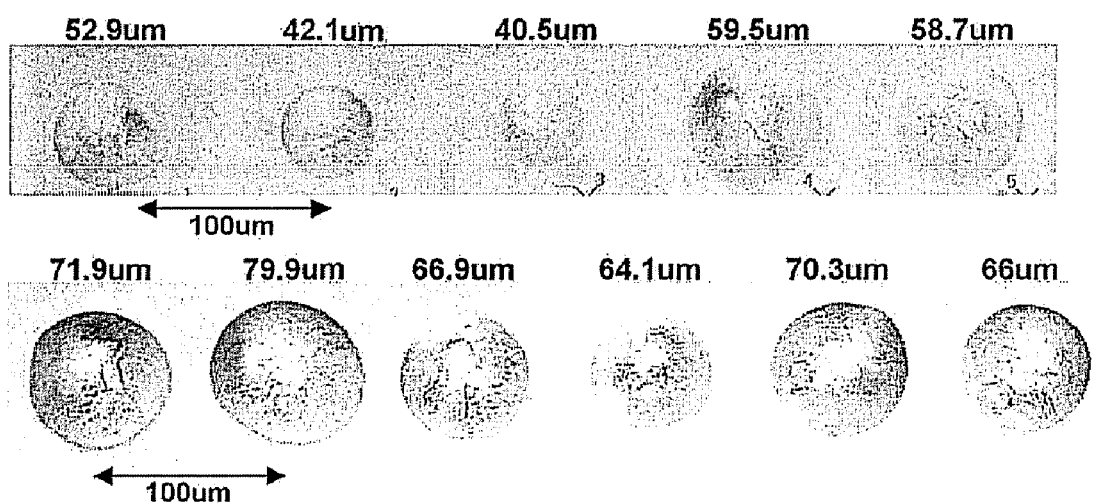
FIG. 17 is a series of microscopic images of printed biomolecular droplets having a diameter of 40.5 μm to 79.9 μm at intervals of 100 μm in an apparatus for printing biomolecular droplets on a substrate formed of 2 percent by weight of agarose gel according to an exemplary embodiment of the present invention.

Experiment 3 was performed in a manner similar to that of Experiment 1 using the 2 percent by weight agarose gel as a substrate, except that the biomolecular droplets were printed to have various diameters in a range of about 40 μm to about 80 μm at intervals of 100 μm. FIG. 17 is a series of microscopic images of printed biomolecular droplets having diameters of about 40 μm to about 80 μm at intervals of 100 μm. Referring to FIG. 17, even when the diameter of the biomolecular droplets is greater than 50 μm, the biomolecular droplets were printed at intervals of 100 μm regardless of the diameter of the biomolecular droplets.

To confirm the relationship between the size of biomolecular droplets printed by an apparatus for printing biomolecular droplets according to an exemplary embodiment of the present invention and the number of biomolecules included in the printed biomolecular droplets, the Experiment 4 was performed.

The apparatuses for printing biomolecular droplets of Experiment 1 and the control group were used, and the biomolecular droplets accommodated in the accommodating area was prepared by adding a A549 (KOREAN CELL LINE BANK, KCLB10185) cells having a concentration of $10 \times 10^6$ cells/mL into RPMI media, 10% FBS and 1X Antibiotics. An AC voltage of 3 kV at a frequency of 4 kHz was applied to the electric field forming electrode, and 73 biomolecular droplets were printed on the substrate at intervals of 100 μm by setting the biomolecular droplets suspended from the nozzle to a certain size. In the case of the control group, the interval between biomolecular droplets was 300 μm. Elapsed time for printing the 73 biomolecular droplets times was measured. The diameter of the printed biomolecular droplets was measured and the number of cells included in each of the biomolecular droplets was calculated by observing the biomolecular droplets printed on the substrate with a microscope. In addition, regression analysis for the number of cells included in the biomolecular droplets with respect to the diameter of the biomolecular droplets was performed to obtain a value of $R^2$. The results are shown in FIGS. 18A (Experiment 4) and 18B (control group).

Figure 18A:
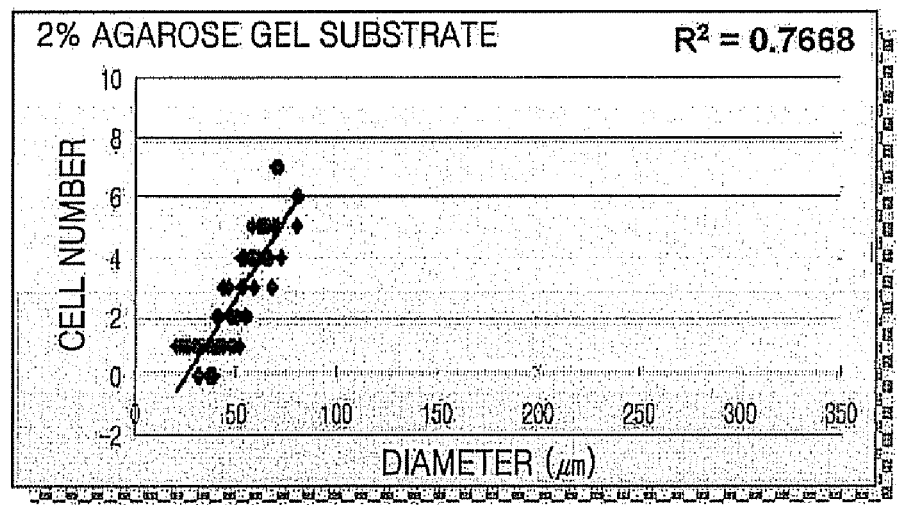
FIG. 18A is a graph showing a calculated number of cells from 78 trials in which biomolecular droplets are printed using an apparatus for printing biomolecular droplets including a substrate formed of 2 percent by weight of agarose gel according to an exemplary embodiment of the present invention.
Figure 18B:
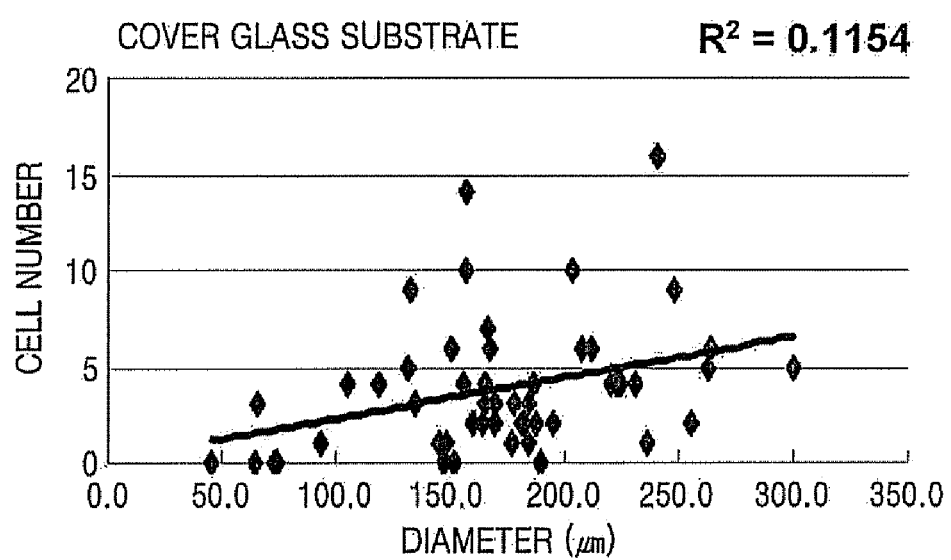
FIG. 18B is a graph showing a calculated number of cells from 78 trials in which biomolecular droplets are printed using an apparatus for printing biomolecular droplets with a cover glass substrate according to an exemplary embodiment of the present invention.

Referring to FIG. 18A, which shows the results of Experiment 4 using a 2 percent by weight agarose gel as a substrate, in which the diameter of the biomolecular droplets was less than 80 μm and the value of $R^2$ was 0.7668. Accordingly, the relationship between the size of the biomolecular droplets and the number of cells included in the biomolecular droplets was very predictable compared to that in the control group. On the other hand, in the case of the control group using a cover glass substrate, the diameter of the biomolecular droplets had a very wide range of 50-300 μm, and thus the volume of the biomolecular droplets had a large variation, resulting in a reduction in uniformity of the biomolecular droplets. In addition, it was observed that the value of $R^2$ was 0.1154, and thus the correlation between the size of the biomolecular droplets and the number of cells included in the biomolecular droplets was significantly less predictable compared to that of the printing apparatus of Experiment 4. Furthermore, the time to print 73 biomolecular droplets was about 10 minutes less in Experiment 4, and thus it was confirmed that the biomolecular droplets printed more rapidly than in the case of the control group.

Figure 19:
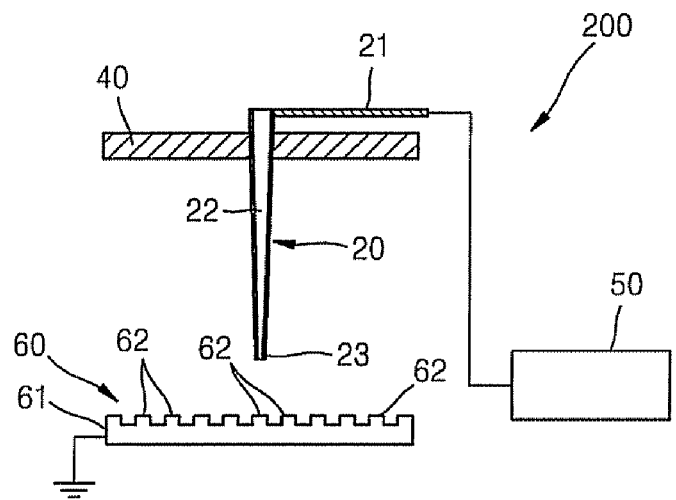
FIG. 19 is a schematic cross-sectional view of an apparatus for consecutively printing biomolecular droplets according to an exemplary embodiment of the present invention.
Figure 21:
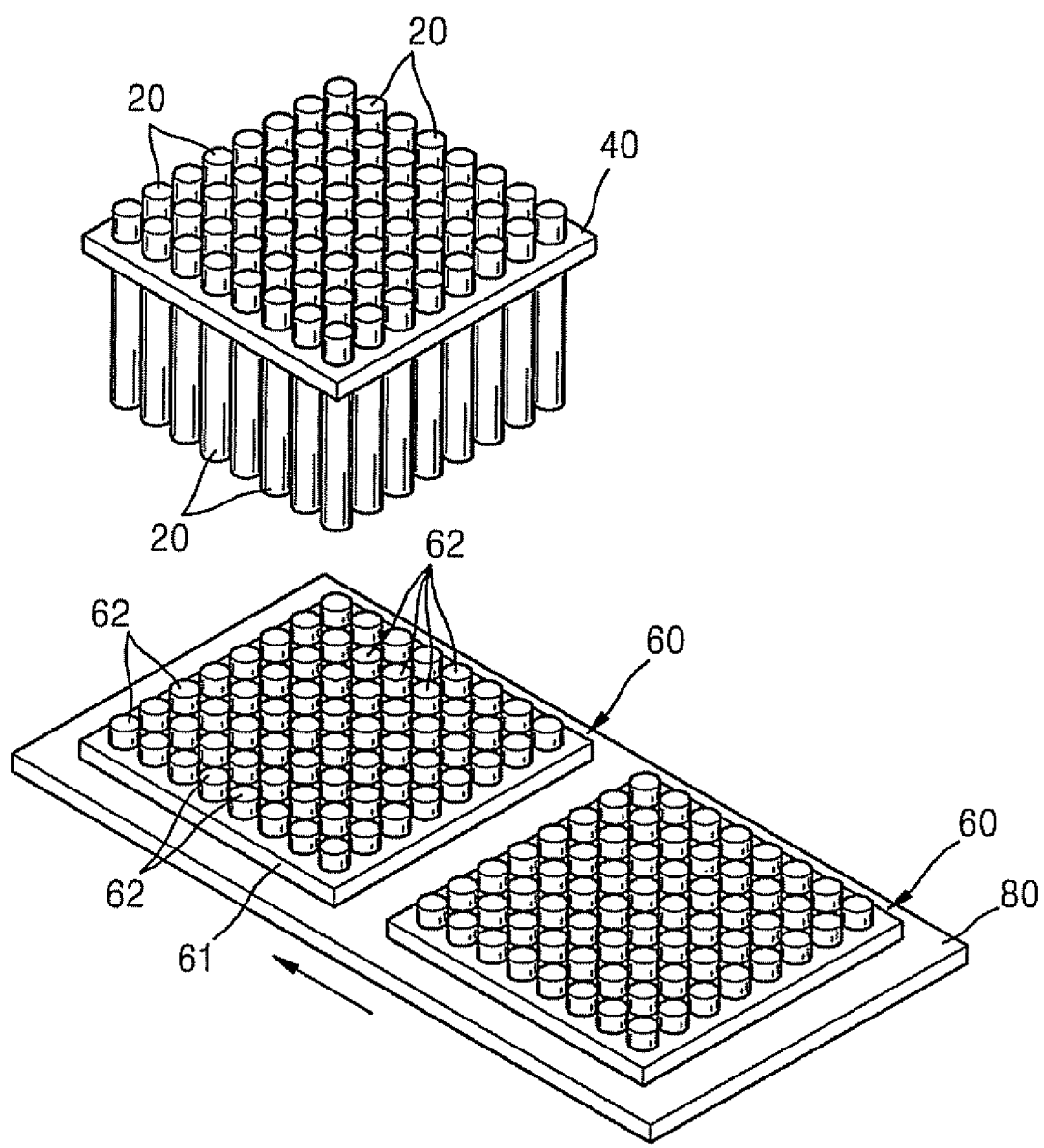
FIG. 21 is a schematic diagram for illustrating a process of simultaneously printing biomolecular droplets using the apparatus illustrated in FIG. 20, according to an exemplary embodiment of the present invention.

In the above-described exemplary embodiment, the surface of the substrate 30 is flat, and only one target surface 31 is formed on the substrate 30. However, in a device 200 for printing a biomolecular droplet using an electric charge concentration effect according to another exemplary embodiment of the present invention illustrated in FIG. 19, a plurality of protrusions 62 can be formed on a surface of a substrate 60 to become plurality of target surfaces. As illustrated in FIG. 19, the substrate 60 comprises a planar part 61 and a plurality of protrusions 62 protruding upward from the planar part 61. The protrusions 62 can be disposed with the same pitch between adjacent protrusions 62. Each of the protrusions 62 is a target surface on which a biomolecular droplet 10 (FIGS. 10A and 12) discharged from a nozzle 23 of an electric field forming electrode 20 is deposited. The electric field forming electrode 20 includes an accommodating area 22. The substrate 60 can be disposed on a stage 80 as illustrated in FIG. 21, and the stage can be moved by a conveyor (not shown), for example, but is not limited thereto.

Further referring to FIG. 19, in the apparatus 200, a printer body 40 is moved by a driving device (not shown) to dispose the electric field forming electrode 20 above the protrusions 62 onto which the biomolecular droplet 10 is to be printed, and then the biomolecular droplet 10 is ejected onto the protrusion 62 of the substrate 60 by applying a DC voltage and an AC voltage supplied from an open circuit type voltage applying unit 50 to the electric field forming electrode 20. The printer body 40 is then moved again by the driving device (not shown) to dispose the electric field forming electrode 20 above a next protrusion 62, and a next biomolecular droplet 10 is printed by applying the DC voltage and the AC voltage to the electric field forming electrode 20 again. The printer body 40 is moved again and the process is repeated. Using such a method, the biomolecular droplet 10 is ejected onto all of the protrusions 62.

When a target DNA fragment to be analyzed is bound to the biochip or DNA microarray manufactured by printing the biomolecular droplet 10 on all of the protrusions 62 as described above, a hybridization bond formed on each protrusion 62 can be observed using an optical method or a radioactive chemical method, since the protrusions 62 are separated from each other by indentations. Accordingly, a base sequence of the target DNA can be more accurately analyzed.

Figure 20:
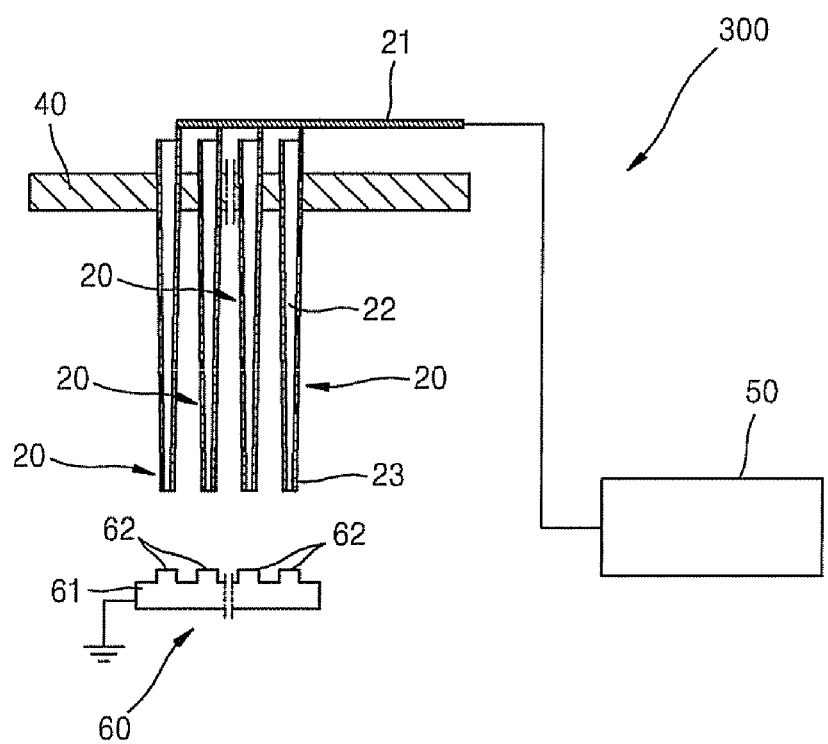
FIG. 20 is a schematic cross-sectional view of an apparatus for simultaneously printing biomolecular droplets according to an exemplary embodiment of the present invention.

The device illustrated in FIG. 19 includes one electric field forming electrode which can be moved in three dimensions by a separate driving device (not shown) to print the biomolecular droplet 10 on each protrusion 62. Alternatively, a device 300 can be constructed as illustrated in FIG. 20. Referring to FIG. 20, a plurality of electric field forming electrodes 20 can be arranged to correspond to each protruding part 62. The electric field forming electrodes 20 have the same pitch as the pitch of the protrusions 62. Therefore, the protrusions 62 correspond to each of the electric field forming electrodes 20. Each of the electric field forming electrodes 20 is electrically insulated. In addition, each of the electric field forming electrodes 20 is electrically connected to an electrode lead wire 21, and the electrode lead wire 21 is electrically connected to an open circuit type voltage applying unit 50. Accordingly, when the open circuit type voltage applying unit 50 is driven, voltage is applied to all of the electric field forming electrodes 20.

As illustrated in FIG. 21, when printing of biomolecules is terminated on one substrate 60, the stage 80 supporting the substrate 60 is automatically moved, and thus the biomolecular droplet call be printed on a subsequent substrate 60 (e.g., the substrate 60 not directly under the printer body 40 in FIG. 21).

The present invention provides an apparatus and method with a modified substrate which rapidly and stably prints biomolecular droplets which have a small and homogenous volume and a narrow interval between neighboring droplets by introducing a solid substrate in which a moisture thin film exists on a top surface of the substrate. The present invention should not be construed as being limited to the exemplary embodiments set forth herein. Rather, these exemplary embodiments are provided so that this disclosure will be thorough and complete and will fully convey the concept of the present invention to those skilled in the art.

For example, the printer body is included in the exemplary embodiments of the present invention described in the detailed description, but the printer body is not a necessary element.

In addition, AC and DC voltages are simultaneously applied to electric field forming electrodes in the exemplary embodiments of the present invention described in the detailed description, however, it is noted that only one of the AC and DC voltages may be applied to the electric field forming electrode in alternative exemplary embodiments.

The positive charges migrate into the biomolecular droplet and the negative charges are induced in the substrate in the exemplary embodiments of the present invention described in the detailed description. However, if negative charges migrate into the biomolecular droplet and positive charges are induced in a portion of substrate directly below the biomolecular droplet due to the negative charges, the Coulomb force is still generated between the negative charges and the positive charges, thereby causing the biomolecular droplet to drop onto the substrate by the Coulomb force.

The substrate includes the planar layer and the plurality of protrusions in some of the exemplary embodiments of the present invention described in the detailed description, however, the substrate may include only the planar layer in alternative exemplary embodiments.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for printing a biomolecular droplet onto a substrate using an electric charge concentration effect, the apparatus comprising:
   an electric field forming electrode which is needle-shaped, is made of a conductive material, is disposed vertically, and comprises an accommodating area which accommodates the biomolecular droplet and a nozzle formed on a bottom end of the accommodating area through which the biomolecular droplet is discharged;
   a solid substrate which is disposed below the electric field forming electrode, is electrically grounded, and comprises a target surface onto which the biomolecular droplet discharged from the nozzle of the electric field forming electrode is deposited and a moisture thin film formed thereon by dispersing water into solid components on a top surface of the substrate; and
   an open circuit type voltage applying unit which is electrically connected to the electric field forming electrode, applies a charge to the electric field forming electrode, and causes the biomolecular droplet to be ejected onto the target surface of the substrate due to a force generated by the charge in the electric field forming electrode and a charge induced on the substrate by the charge in the electric field forming electrode.

2. The apparatus of claim 1, wherein the solid substrate further comprises agarose gel.

3. The apparatus of claim 2, wherein the amount of agarose is about 0.1 percent by weight to about 15 percent by weight of the agarose gel.

4. The apparatus of claim 1, wherein the solid substrate further comprises a membrane filter soaked with water.

5. The apparatus of claim 4, wherein the membrane filter comprises a material selected from the group consisting of polycarbonate, nylon, cellulose acetate, polyester sulfone and polytetrafluoroethylene (PTFE).

6. The apparatus of claim 1, wherein the solid substrate further comprises a mesh soaked with water and a diameter of the mesh is about 40 μm to about 500 μm.

7. The apparatus of claim 6, wherein the mesh comprises a material selected from the group consisting of polycarbonate, nylon, cellulose acetate, polyester sulfone and polytetrafluoroethylene (PTFE).

8. The apparatus of claim 1, wherein the biomolecular droplet comprises a biomolecular material selected from the group comprising nucleic acids, proteins, oligopetides, saccharides, eukaryotic cells, stem cells, viruses and bacteria.

9. The apparatus of claim 1, wherein the biomolecular droplet which is printed on the substrate has a diameter of about 50 μm or less.

10. The apparatus of claim 1, further comprising a printer body disposed above the nozzle of the electric field forming electrode, the printer body supporting the electric field forming electrode.

11. The apparatus of claim 1, wherein the electric field forming electrode and the open circuit type voltage applying unit are electrically connected to an electrode lead wire which is connected to a top end of the electric field forming electrode.

12. The apparatus of claim 1, wherein the open circuit type voltage applying unit simultaneously applies an AC voltage and a DC voltage to the electric field forming electrode and forms an electric field below the electric field forming electrode.

13. The apparatus of claim 12, wherein the DC voltage is in a range of about 5 V to about 100,000 V and the AC voltage is in a range of about 5 V to about 100,000 V.

14. The apparatus of claim 12, wherein the DC voltage is in a range of about 500 V to about 10,000 V and the AC voltage is in a range of about 500 V to about 10,000 V.

15. The apparatus of claim 12, wherein the AC voltage has a frequency in a range of about 10 Hz to about 1,000 Hz.

16. The apparatus of claim 12, wherein the DC voltage is about 2,000 V, the AC voltage is about 500 V and the AC voltage frequency is about 130 Hz.

17. The apparatus of claim 1, wherein the substrate further comprises a planar part and a plurality of protrusions protruding upwards from the planar part, each of the protrusions is a target surface of the substrate.

18. The apparatus of claim 1, wherein the substrate is disposed substantially perpendicular to and below a longitudinal axis defining the electric field forming electrode.

19. The apparatus of claim 1, wherein the electric field forming electrode is made of at least one selected from the group consisting of a conductive metal, a conductive polymer and indium tin oxide glass.

20. The apparatus of claim 1, wherein a portion of the nozzle of the electric field forming electrode is hydrophobically treated.

21. The apparatus of claim 1, wherein a plurality of electric field forming electrodes are arranged with a pitch, a plurality of target surfaces are arranged on the substrate with the same pitch as the electric field forming electrodes, and each of the target surfaces is disposed to correspond to one of the electric field forming electrodes.

22. A method of printing a biomolecular droplet on a substrate using an electric charge concentration effect, the method comprising:
vertically disposing an electric field forming electrode which is needle-shaped, is made of a conductive material, and comprises an accommodating area in which the biomolecular droplet is accommodated and a nozzle formed at a bottom end of the accommodating area through which the biomolecular droplet is discharged;
disposing a solid substrate below the electric field forming electrode, wherein the solid substrate is grounded and includes a target surface onto which the biomolecular droplet discharged from the nozzle of the electric field forming electrode is deposited;
forming a moisture thin film on the solid substrate by dispersing water into solid components on a top surface of the solid substrate;
disposing an open circuit type voltage applying unit which is electrically connected to the electric field forming electrode;
supplying a biomolecular droplet to the accommodating area of the electric field forming electrode; and
separating the biomolecular droplet when the open circuit type voltage applying unit applies a voltage to the electric field forming electrode so that the biomolecular droplet is ejected onto the target surface of the solid substrate.

* * * * *